US011567684B1

United States Patent
Tsirkin et al.

(10) Patent No.: US 11,567,684 B1
(45) Date of Patent: Jan. 31, 2023

(54) CONSTANT TIME UPDATES AFTER MEMORY DEDUPLICATION

(71) Applicant: Red Hat, Inc., Raleigh, NC (US)

(72) Inventors: Michael Tsirkin, RaAnana (IL); Zhe Xu, Toronto (CA); Andrea Arcangeli, New York, NY (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/392,552

(22) Filed: Aug. 3, 2021

(51) Int. Cl.
*G06F 3/06* (2006.01)
*G06F 7/58* (2006.01)

(52) U.S. Cl.
CPC .......... *G06F 3/0641* (2013.01); *G06F 3/0604* (2013.01); *G06F 3/067* (2013.01); *G06F 3/0608* (2013.01); *G06F 3/0659* (2013.01); *G06F 7/588* (2013.01)

(58) Field of Classification Search
CPC ..................................................... G06F 7/588
See application file for complete search history.

(56) References Cited

U.S. PATENT DOCUMENTS

| | | | | |
|---|---|---|---|---|
| 8,528,085 B1 * | 9/2013 | Juels | .................. | G06F 21/6218 726/22 |
| 8,909,845 B1 * | 12/2014 | Sobel | .................. | G06F 9/45558 711/6 |
| 9,436,603 B1 * | 9/2016 | Pohlack | ............... | G06F 21/556 |
| 10,261,820 B2 * | 4/2019 | Tsirkin | ................ | G06F 9/45558 |
| 10,318,161 B2 * | 6/2019 | Lublin | ................. | G06F 3/0673 |
| 10,482,064 B2 * | 11/2019 | Dmitriev | .............. | G06F 16/174 |

OTHER PUBLICATIONS

Daniel Gruss, et al; "Practical Memory Deduplication Attacks in Sandboxed JavaScript"; Graz University of Technology, Austria; 2015; (16 pages).
Suzaki, et al; "Software Side Channel Attack on Memory Deduplication"; Researchgate; Jan. 2011; ; (3 pages).
Suzaki, et al; "Memory Deduplication as a Threat to the Guest OS"; National Institute of Advanced Industrial Science and Technology; Apr. 2011; (6 pages).
Lindemann, et al; "On the Detection of Applications in Co-Resident Virtual Machines via a Memory Deduplication Side-Channel"; Security and Privacy Group, Depailinent of Computer Science, University of Hamburg, Germany 2018; (15 pages).
Shahzad, et al.; "Virtualization Technology: Cross-VM Cache Side Channel Attacks make it Vulnerable"; Australasian Conference on Information Systems; 2015; (14 pages).

* cited by examiner

*Primary Examiner* — William E. Baughman
(74) *Attorney, Agent, or Firm* — K&L Gates LLP (57) ABSTRACT

Systems and methods are described for resource-efficient memory deduplication and write-protection. In an example, a method includes receiving, by a computing device having a processor, a request to assess deduplication for a plurality of candidate files. The computing device may perform one or more iterative steps for deduplication. The iterative steps may include: receiving, from the plurality of candidate files, a candidate file that is not write-protected; determining, based on a predetermined Bernoulli distribution, a decision to write-protect the candidate file; rendering the candidate file as a write-protected candidate file; determining, based on a review of other candidate files from the plurality of candidate files, that the write-protected candidate file can be deduplicated; and deduplicating the write-protected candidate file.

20 Claims, 5 Drawing Sheets

CONSTANT TIME UPDATES AFTER MEMORY DEDUPLICATION

BACKGROUND

Computing systems often use various techniques to improve memory utilization. Efficient memory management is not only critical to the performance of computing systems, but also helps to prevent cyberattacks. Memory deduplication improves memory utilization by detecting that a plurality of files in memory are identical (or satisfy a similarity threshold). The plurality of files may be merged into a single file, or the unoriginal file(s) of the plurality of files may be deleted. Write-protection is another way to improve memory management. Write protection allows for certain files to be rendered as read-only, so that any modification to a write-protected file may require a separate copy to be created. Write-protection allows computing systems to isolate deduplicated files and to more efficiently track duplicate files.

SUMMARY

The present disclosure provides new and innovative systems and methods for resource-efficient memory deduplication and write-protection. In an example, a method includes receiving, by a computing device having a processor, a request to assess deduplication for a plurality of candidate files. The computing device may perform one or more iterative steps for deduplication. The iterative steps may include: receiving, from the plurality of candidate files, a candidate file that is not write-protected; determining, based on a predetermined Bernoulli distribution, a decision to write-protect the candidate file; rendering the candidate file as a write-protected candidate file; determining, based on a review of other candidate files from the plurality of candidate files, that the write-protected candidate file can be deduplicated; and deduplicating the write-protected candidate file. In some aspects, the Bernoulli distribution may be based on a probability generated by a random number generation (RAN) function. Also or alternatively, the Bernoulli distribution may be based on or otherwise affected by a network bandwidth of the computing device. In some embodiments, the method may update the memory after the deduplication in constant time.

In some aspects, deduplicating the write-protected file may include identifying, for the candidate file, a first location in a memory associated with the computing device. Moreover, the candidate file may be stored in the first location. The computing device may search, within the memory, a duplicate file comprising at least a predetermined threshold of data found in the candidate file, and then identify, for the duplicate file, a second location in the memory where the duplicate file may be currently stored. In some aspects, the computing device may then delete contents of the duplicate file from the second location, and store, at the second location, a pointer to the first location. Alternatively, the computing device may delete contents of the candidate file from the first location, and then store, at the first location, a pointer to the second location.

Another method may include receiving, by a computing device having a processor, a plurality of candidate files to assess for write-protection and deduplication; generating, based on a review of other candidate files, a first list of candidate files that can be deduplicated, and a second list of candidate files that cannot be deduplicated. For each of a plurality of candidate files in the first list, the computing device may determine, based on a predetermined first Bernoulli distribution, a first decision to either assess or deny permission to assess the candidate file in the first list for write-protection; identify, based on a permission to assess, the candidate file in the first list as a write-protected candidate file; and deduplicate the write-protected candidate file. For each of a plurality of candidate files in the second list, the computing device may determine, based on a predetermined first Bernoulli distribution, a second decision to either assess or deny permission to assess the candidate file in the second list for write-protection; and if a given candidate file in the second list is not write-protected, rendering, based on the second decision, the candidate file as a write-protected candidate file.

In an example, a system includes a processor and memory storing instructions. When the instructions are executed by the processor, the instructions cause the processor to: receive a plurality of candidate files to assess for write-protection and deduplication; perform one or more iterative steps. The iterative steps may include determining whether a given candidate file of the plurality of candidate files is write-protected. After determining that the given candidate file is not write-protected, the iterative steps may include determining, based on a predetermined Bernoulli distribution, whether to write-protect the given candidate file; rendering, based on the Bernoulli distribution, the given candidate file as a write-protected candidate file; determining, based on a review of other candidate files from the plurality of candidate files, that the write-protected candidate file can be deduplicated; and deduplicating the write-protected candidate file.

In another example, a system includes a processor and memory storing instructions. When the instructions are executed by the processor, the instructions cause the processor to: perform one or more steps or methods described herein. In another example, a non-transitory computer-readable medium is disclosed for use on a computer system containing computer-executable programming instructions for performing one or more methods described herein.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Conventional methods of memory deduplication and/or write protection may be resource-intensive as such functions require relatively high processor usage and/or network bandwidth (e.g., where memory is remotely located in a different server). Such operations often slow down computing systems, making it harder for to use to perform day to day activities. Furthermore, conventional methods of memory deduplication and/or write-protection may often be predictable for bad actors, thus rendering computing systems vulnerable for cyberattacks. There is thus a need for systems and methods of memory deduplication and/or write protection that is less resource-intensive, more robust to hackers, and is less likely to interfere with user experience of a computing system. Various embodiments of the present disclosure describe techniques for memory deduplication and/or write protection that conserve resources, for example, by restricting the number of files that can be deduplicated and/or write-protected at any given session. Furthermore such techniques utilize randomized processes for determining which files to write-protect and/or deduplicate to evade attempts by bad actors to detect write-protected and/or deduplicated files. Furthermore, by deduplicating only a portion of all files that can potentially be deduplicated, or write-protecting only a portion of all files that can potentially be write-protected, the processors of a computing system is able to free up to allow the computing system to be utilized by users for other tasks. In some embodiments, the memory may be updated based on deduplication in constant time.

Figure 1:
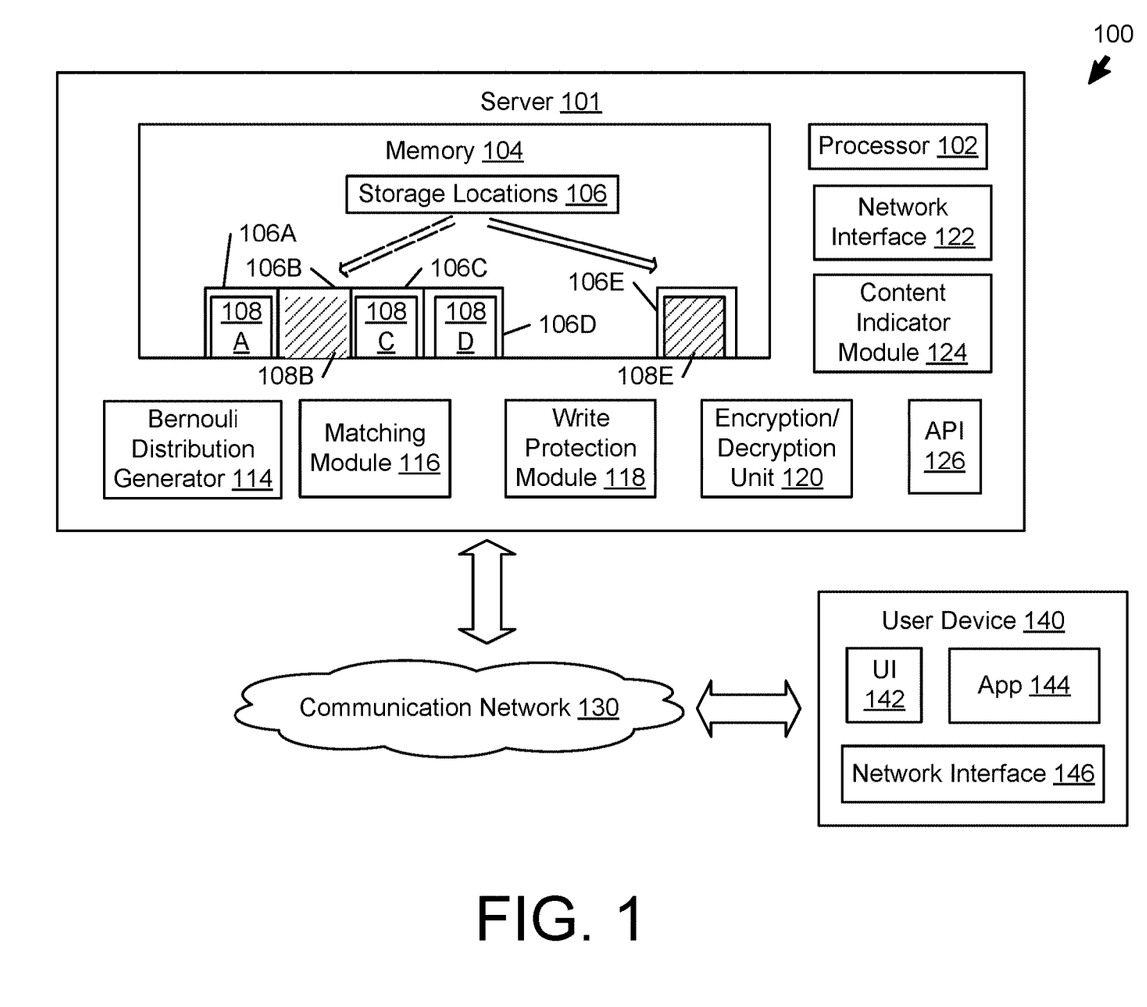
FIG. 1 illustrates a block diagram of an example computer network environment for a resource-efficient memory deduplication and write-protection, according to an example embodiment of the present disclosure.

FIG. 1 illustrates a block diagram of an example computer network environment for a resource-efficient memory deduplication and write-protection, according to an example embodiment of the present disclosure. The network environment 100 may include a server 101 and one or more user devices 140 that may be able to communicate with one another over a communication network 130. As will be described, the server 101 may improve its memory utilization by identifying write-protected and/or non-write-protected files, identifying duplicate files, determining standards for assessing write-protection and/or deduplication decisions, and performing write protection and deduplication, among other functions.

The user device 140 may comprise a standalone or portable computing device (e.g., a mobile device, personal digital assistant, laptop, tablet computers, smart camera, etc.). The user device 140 may be associated with an operator that may customize functions performed by the server 101, including altering any standards that the server 101 uses to assess deduplication or write-protection decisions. Also or alternatively, the user device 140 may be associated with a user that wishes to access and/or modify one of the files stored and/or managed by the server 101. For example, the user device 140 may include a user interface 142 allowing a user or operator to enter input (e.g., via a touchchreen, keyboard, mouse, typepad, etc.), and receive output (e.g., via a display screen, audio, etc.). Furthermore, the user device 140 may include an application 144 that may allow the user or operator to communicate with the server 101, access files stored by the server, and/or influence the deduplication and/or write protection operations. The application 144 may be managed, hosted, and/or facilitated by the application programming interface (API) 126 of the server 101.

The server 101 may comprise a local or a remote computing system for performing operations associated with resource-efficient memory deduplication and write-protection. Also or alternatively, server 101 may be representative of a collection of disparate servers, e.g., represented by various components of server 101. The server 101 may include one or more processors 102 and memory 104. In the example shown, the server 101 may further include a display 112, a Bernoulli distribution generator 114, a matching module 116, a write-protection module 118, an encryption/decryption unit 120, a network interface 122, a content indicator module 124, and an application programming interface (API) 126. The memory 104 may comprise one or more long term, short term, volatile, nonvolatile, or other memory and is not to be limited to any particular type of memory or number of memories, or type of media upon which memory is stored. The memory may store instructions that, when executed by the processor 102, can cause the server 101 to perform one or more methods discussed herein. Moreover, memory 104 may include storage locations 106 that store a plurality of files (e.g., files 108A-108D, 110). For example, memory 104 may include storage locations 106A, 106B, 106C, and 106D, and 106E that may store files 108A, 108B, 108C, 108D, and 108E, respectively. Each file may comprise content that can be represented as values (e.g., pixels, state or data pattern of the file, etc.). As used herein, a file may comprise any computer resource of stored data. A file may be designed to store an image, a written message, a video, a computer program, or any wide variety of other kinds of data. A storage location may be a location or an address of the file. For simplicity, a file may be inclusive of, and may be used to refer to, units of virtual memory, such as virtual pages.

The content indicator module 124 may comprise of a software, program, and/or code that causes the processor 102 to show the values of the content of the file, e.g., to compare the file to other files. The encryption/decryption unit may comprise a software, program, and/or code that causes the processor 102 to encrypt files as it is stored in the storage location, or presented to certain external devices. Encryption may be performed to protect the identity of the file, safeguard sensitive content, or otherwise prevent the file from being altered by bad actors. Also or alternatively, the encryption/decryption unit 120 may comprise a decryption program or software to decrypt an otherwise encrypted file, e.g., to allow a matching module to compare the file to other files. In some aspects, the content indicator module 124 may be assisted with or may comprise the encryption/decryption unit 120.

Matching module 116 may comprise a software, program, and/or code that cause the processor 102 to determine, via the content indicator module 124, that two or more files within the storage locations 106 have matching content (e.g., files 108B and 108E stored in storage locations 106B and 106E, respectively). The determination may involve analyzing the values of the files as presented by the content indicator module 124 to determine whether a predetermined and/or sufficient number of values of the corresponding files satisfy a similarity threshold. The processor may identify files with matching content by comparing values of a file (e.g., file 108E) presented by the content indicator module 124 (e.g., state or data pattern of the file) with values of one or more other files (e.g., files 108A-108D) presented by the content indicator module 124. Once matching files are identified, the processor 102 may store an indication of which storage locations contain the matching files. The file within each storage location may be considered matching with another file stored in another storage location even though both files may not necessarily have identical data since storage locations may include additional content (e.g., unused space, padding, metadata). In one example, the determination may involve analyzing (e.g., scanning/comparing) files of the storage locations without accessing (e.g., scanning/comparing) other content of the storage locations.

Figure 2:
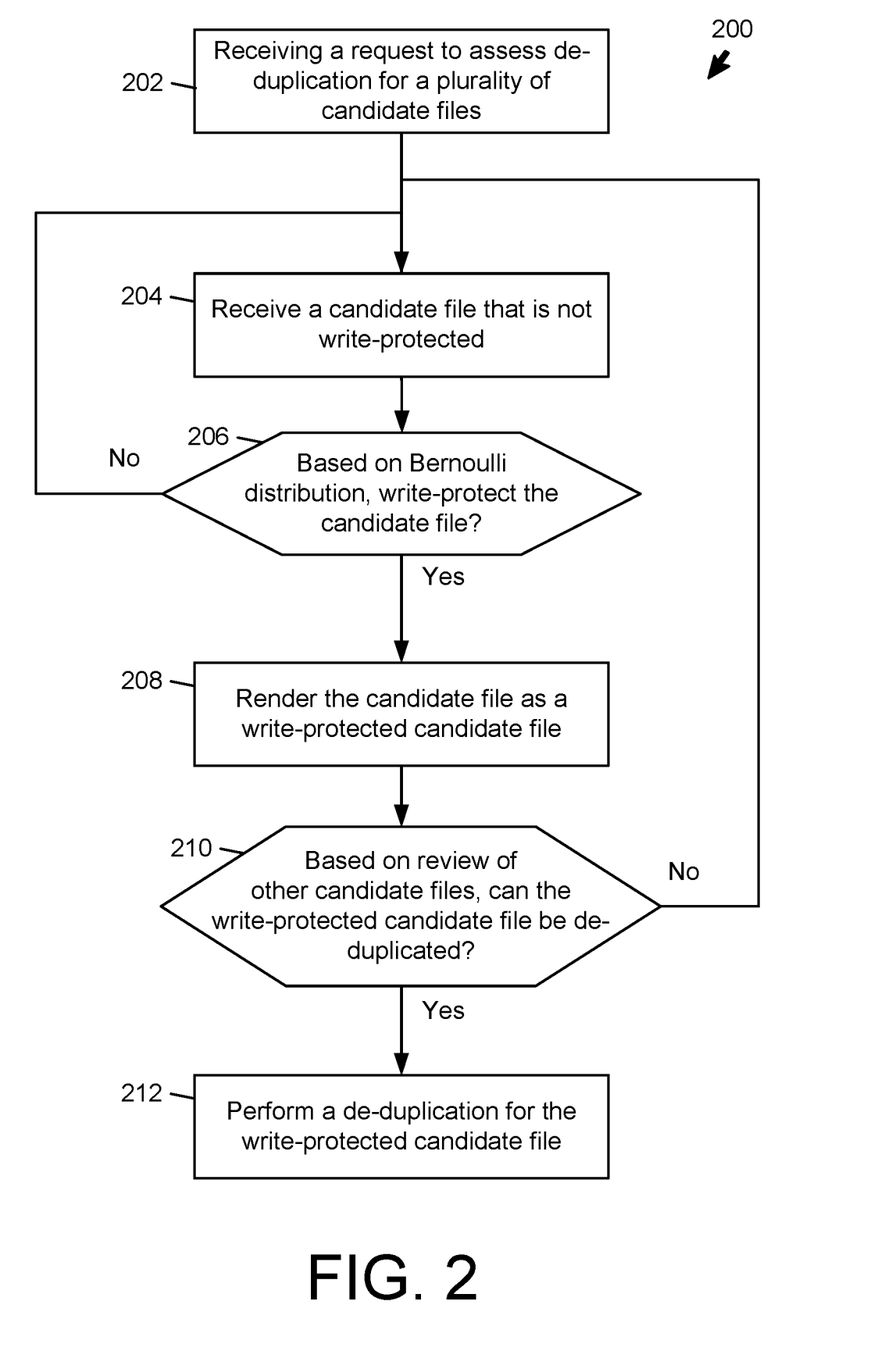
FIG. 2 illustrates a flowchart of an example process for a resource-efficient memory deduplication and write-protection according to an example embodiment of the present disclosure.
Figure 3:
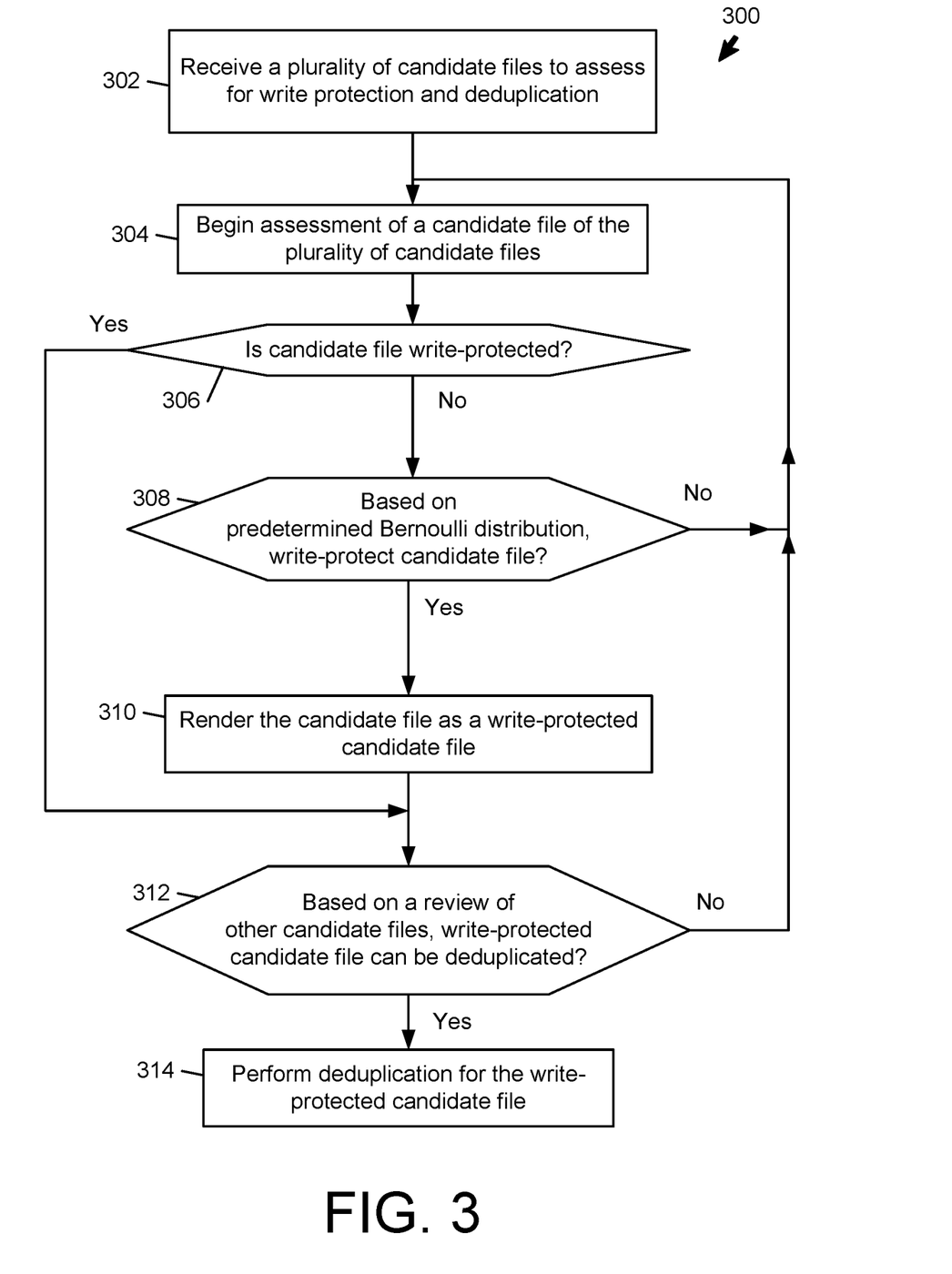
FIG. 3 illustrates a flowchart of another example process for a resource-efficient memory deduplication and write-protection, according to an example embodiment of the present disclosure.
Figure 4:
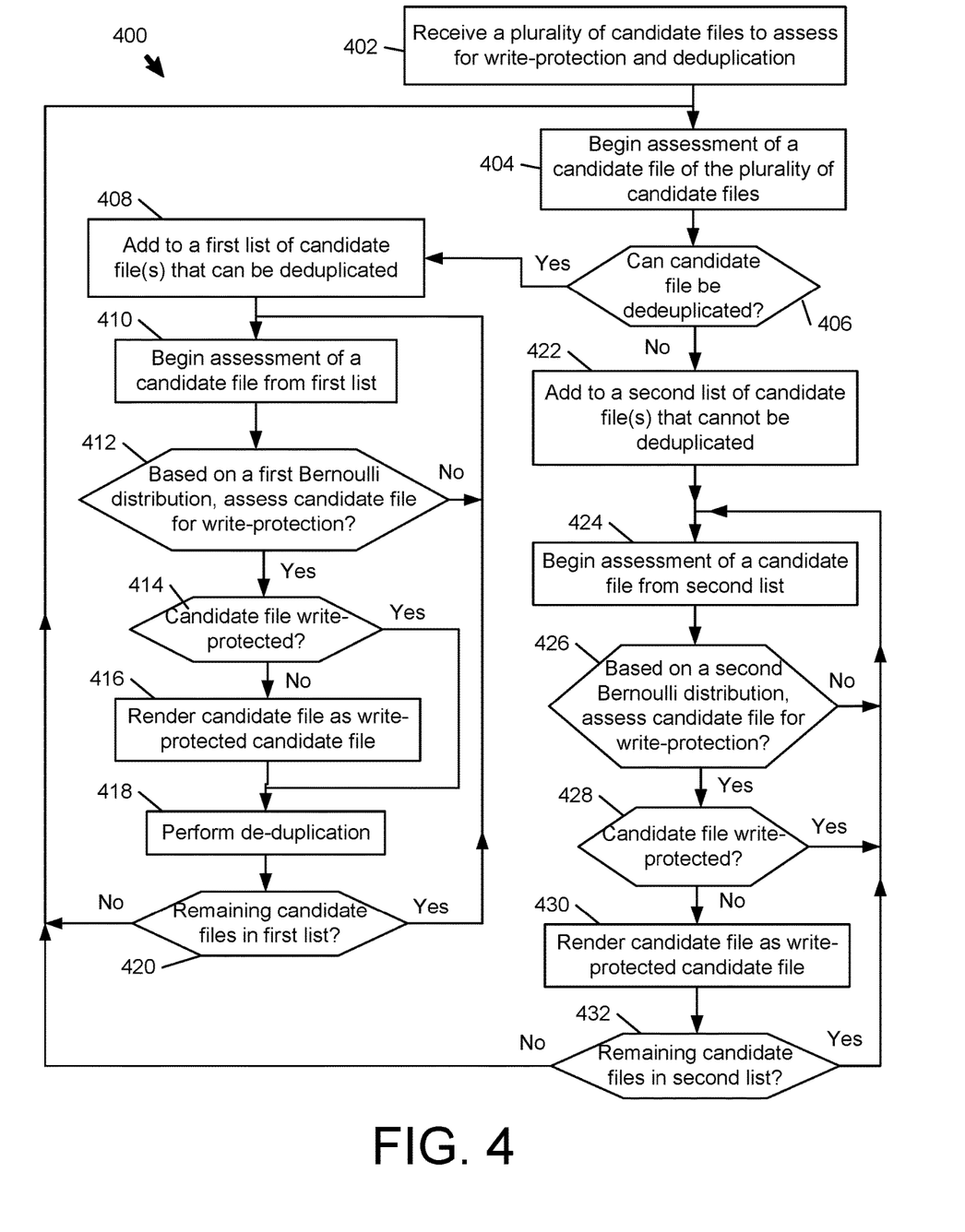
FIG. 4 illustrates a flowchart of an example process for a resource-efficient memory deduplication and write-protection, based on different Bernoulli distributions, according to an example embodiment of the present disclosure.

A write protection module 118 may comprise a software, program, and/or code used to write-protect one or more files stored in the storage locations 106. In some aspects, write-protection may involve rendering a file as read-only, such that any modification to a write-protected file may require a separate copy to be created. Also or alternatively, write-protection may involve rendering a file such that the file cannot be altered (e.g., by detecting any modification and then undoing the modification to the original unaltered state of the file). In some aspects, modifications to a file may be detected by comparing checksum values of a file at one or more intervals of time. The checksum value may be a small sized block of data (e.g., a cryptographic hash function or string of numbers) that is derived from a larger data (e.g., the file). The interval of time may comprise a "pass" through a program executed by processor 102. In some aspects, the program may comprise one or more blocks of FIGS. 2-4, presented herein.

The decision to write-protect and/or deduplicate a file may depend on a Bernoulli distribution. In some aspects, the Bernoulli distribution may be generated by a Bernoulli distribution generator 114. The Bernoulli distribution generator 114 may comprise a code that causes the processor 102 to generate a Bernoulli distribution, a discrete probability distribution of a random variable which takes the value 1 with a first probability, p, and the value 0 with a second probability, q, where q=1−p. The first probability, p, may be obtained randomly. Also or alternatively, the Bernoulli distribution generator may generate values for p and q, which are reflective of a network bandwidth, processor capacity, or other hardware constraint of the server 101. For example, the Bernoulli distribution may be modified such that the relationship of p and q is such that q<p only if the hardware constraint satisfies a predetermined threshold (e.g., the network capacity of the server 101 is optimal). In some aspects, the Bernoulli distribution generator 114 may perform multiple Bernoulli distributions (e.g., for concurrent processes of write-protection and/or deduplication) as will be described in relation to FIG. 4.

The server 100 may further comprise an API 126 to allow approved or recognized external computing systems (e.g., user device 140) to influence the deduplication or write-protection operations performed by the server 101, or otherwise allow the user device 140 to access, modify, and/or store files. For example, the API 126 may host, manage, or otherwise facilitate the running of application 144 on user device 140.

The computing systems of network environment 100 may each include respective network interfaces (e.g., network interface 122 and 146) to communicate with other devices over the communication network 130.

The communication network 132 comprises wired and wireless networks. Examples of the wired networks may include a wide area network (WAN) or a local area network (LAN), a client-server network, a peer-to-peer network, and so forth. Examples of the wireless networks comprise Wi-Fi, a global system for mobile communications (GSM) network, and a general packet radio service (GPRS) network, an enhanced data GSM environment (EDGE) network, 802.5 communication networks, code division multiple access (CDMA) networks, Bluetooth networks or long term evolution (LTE) network, LTE-advanced (LTE-A) network or 5th generation (5G) network.

FIG. 2 illustrates a flowchart of an example process 200 for a resource-efficient memory deduplication and write-protection according to an example embodiment of the present disclosure. The process 200 may be performed by one or more processors (e.g., processor 102) of the server 101. For simplicity, "computing device" may be used to refer to the device associated with the processor executing instructions, program, software, code, or module associated with any given step. Although the example process 200 is described with reference to the flow diagram illustrated in FIG. 2, it will be appreciated that many other methods of performing the acts associated with the process 200 may be used. For example, the order of some of the blocks may be changed, certain blocks may be combined with other blocks, blocks may be repeated, and some of the blocks described may be optional.

Process 200 may begin with the server receiving a request to assess deduplication for a plurality of candidate files (block 202). In some aspects, the request may be received from an external computing device. For example, the server 101 may receive a command from user device 140 to begin assessment of deduplication process. Also or alternatively, the request may be received internally. For example, at idle time, the server 101 may detect that the processor 102 has the capacity to begin assessment of deduplication. The assessment for deduplication may involve one or more iterative steps (e.g., as shown via blocks 204-210) that may be performed for each candidate file of a plurality of candidate files. In some aspects, the plurality of candidate files may be selected as a subset of files stored in memory (e.g., files 108A-108E of memory 104). For example, as will be discussed in relation to block 204, the subset of files may be those that are not write-protected. In some aspects, whether a candidate file is write-protected or not may be indicated as a metadata stored in the storage location of the file. Also or alternatively, the write-protection may be evident from the file itself, e.g., based on values stored or detected via the content indicator module 124.

Thus, the server may receive a candidate file that is not write-protected (block 204). The received candidate file may be one from the subset of files that are not write-protected, as previously discussed.

The computing device may then determine, based on a Bernoulli distribution, whether to write-protect the candidate file (block 206). The Bernoulli distribution can allow the server to write-protect only some of the files that are not write-protect instead of all of the files that are not write-protected. Restricting the files to be write-protected during process 200 may help to minimize computer resources, such that the de-deduplication and/or write-protection processes described herein can occur in the background and not interfere with a user's experience while using the files of the server. Otherwise, deciding to write-protect all files that are not yet write-protected may take up the use or capacity of the processor (e.g., for a longer period of time), reduce network bandwidth (e.g., for a longer period of time), or otherwise interfere with a user's experience. As previously discussed, the Bernoulli distribution may be based on probabilities, p, and q, where q=1–p, and may be generated by the Bernoulli distribution generator 114. For example, p may involve a decision to write-protect a candidate file, whereas q may involve a decision to not write-protect the candidate file. If the server decides, based on the Bernoulli distribution, to not write-protect the candidate file (e.g., for which the probability may be q), the server may receive another candidate file that is not write protected (e.g., at block 204) to begin assessment for deduplication.

If the server decides, based on the Bernoulli distribution, to write-protect the candidate file (e.g., based on a probability p), the server may render the candidate file as a write-protected candidate file (block 208). For example, the write protection module 118 of the server 101 may render the file such that it cannot be modified. Also or alternatively, the write protection module 118 may render the file such that any modification results in the creation of a new file distinct from the existing write-protected file, in order to maintain the state of the write-protected file.

Afterwards, the server may determine, based on a review of other candidate files, whether the write-protected candidate file can be deduplicated (block 210). The review of other candidate files to determine whether or not to deduplicate a given candidate file may involve comparing the contents of (e.g., values represented by) two or more files (e.g., the given write-protected candidate file being analyzed at the current iteration and one or more other candidate files) to determine whether a similarity threshold is satisfied. For example, the server 101 may utilize the content indicator module 124 to determine values (e.g., data patterns) of two files (e.g., the given candidate file being analyzed and another candidate file). The matching module 116 may be used to compare the set of values for each of the two files. If a match exists (e.g., a predetermined proportion of values are identical), the two files may be deemed as redundant. If another candidate file is found in the memory 104 that is redundant with the given write-protected candidate file being analyzed in the current iteration, the candidate file can be deduplicated. If there are no duplicate and/or redundant files, the server may receive another candidate file that is not write protected (e.g., at block 204) to begin assessment for deduplication.

Thus, the server may deduplicate the write-protected candidate file (block 212). In some aspects, the deduplication may involve locating (e.g., within the memory 104) the duplicate and/or redundant file, and then deleting the duplicate and/or redundant file. Also or alternatively, deduplicating the write-protected candidate file may involve identifying the location in the memory 104 where the given write-protected candidate file is stored (e.g., a first location) and identifying (after searching) the location in the memory 104 where the duplicate file is stored (e.g., e.g., the second location). The server may then delete the contents of the duplicate file from the location where the duplicate file was previously stored (e.g., the second location), and then store, at that location (e.g., second location), a pointer to the location where the given write-protected candidate file is stored (e.g., the first location). Alternatively, the server may delete contents of the given write-protected candidate file from its location, and then store, at the location, a pointer to the location of the originally duplicate file.

Subsequently, the server may receive another candidate file that is not write protected (e.g., at block 204) to begin assessment for deduplication. Once all candidate files have been assessed for deduplication (e.g., from the original subset of files that are not write-protected), the session associated with the request in block 202 may be deemed as complete.

FIG. 3 illustrates a flowchart of another example process 300 for a resource-efficient memory deduplication and write-protection, according to an example embodiment of the present disclosure. Process 300 may be performed by one or more processors (e.g., processor 102) of the server 101. For simplicity, "computing device" may be used to refer to the device associated with the processor executing instructions, program, software, code, or module associated with any given step. Although the example process 300 is described with reference to the flow diagram illustrated in FIG. 3, it will be appreciated that many other methods of performing the acts associated with the process 300 may be used. For example, the order of some of the blocks may be changed, certain blocks may be combined with other blocks, blocks may be repeated, and some of the blocks described may be optional.

Process 300 may begin with the server receiving a plurality of candidate files to assess for write-protection and deduplication (block 302). The plurality of candidate files may be a portion of or the entirety of files stored in storage locations 106 of memory 104 of the server 101. The receiving of the plurality of candidate files does not necessarily have to occur within one time. For example, a candidate files may be received by the server when the candidate file has been created and stored in memory 104. The assessment for write-protection and deduplication may involve one or more iterative steps (e.g., as shown via blocks 304-312) that may be performed for each candidate file of the plurality of candidate files.

Thus, the server may begin assessment of a candidate file of the plurality of candidate files (block 304). The beginning of assessment (e.g., the beginning of the iterative blocks 304 through 312) may be triggered by a request for such an assessment (e.g., as previously described in relation to block 202 of FIG. 2).

The server may determine whether the candidate file is write-protected (block 306). As previously discussed, whether a candidate file is write-protected or not may be indicated as a metadata stored in the storage location of the file. Also or alternatively, the write-protection may be evident from the file itself, e.g., based on values stored or detected via the content indicator module 124. In some aspects, the server may identify a file as not yet write-protected by detecting that the candidate file has been modified within a threshold number of "passes" (e.g., by processor 102 through a given program or computer-executable instruction).

Based on a predetermined Bernoulli distribution, the server may determine whether to write-protect the candidate file (block 308). The determination may be based on a Bernoulli distribution generated by Bernoulli distribution generator 114 of server 101. Moreover the determination may be performed using methods previously described in relation to block 206 of FIG. 2 The server may render the candidate file as a write-protected candidate file (block 310). The rendering of the candidate file may be performed as previously described in relation to block 208 of FIG. 2.

The server may determine, based on a review of other candidate files, whether the write-protected candidate file can be deduplicated (block 312). As discussed previously, the review of other candidate files to determine whether or not to deduplicate the write-protected candidate file may involve comparing the contents of (e.g., values represented by) two or more files (e.g., the given write-protected candidate file being analyzed at the current iteration and one or more other candidate files) to determine whether a similarity threshold is satisfied. If there are no duplicate and/or redundant files, the server may receive another candidate file (e.g., at block 304) to begin assessment for write-protection and deduplication.

After finding that the write-protected candidate file can be deduplicated based on the determination, the server may deduplicate the write-protected candidate file (block 314). The process for deduplication may be substantively similar to that described in relation to block 212 of FIG. 2.

FIG. 4 illustrates a flow diagram of an example process 400 for a resource-efficient memory deduplication and write-protection, based on different Bernoulli distributions, according to an example embodiment of the present disclosure. Process 400 may be performed by one or more processors (e.g., processor 102) of the server 101. For example, process 400 may involve two or more iterative loops that may be performed by separate processors. For simplicity, "computing device" may be used to refer to the device associated with the processor executing instructions, program, software, code, or module associated with any given step. Although the example process 400 is described with reference to the flow diagram illustrated in FIG. 4, it will be appreciated that many other methods of performing the acts associated with the process 400 may be used. For example, the order of some of the blocks may be changed, certain blocks may be combined with other blocks, blocks may be repeated, and some of the blocks described may be optional.

Process 400 may begin with receiving a plurality of candidate files to assess for write-protection and deduplication (block 402). The implementation of block 402 may be substantively similar to block 302 of FIG. 3. However, process 400 describes at least one embodiment where the received candidate files may be divided into two lists, e.g., for parallel processing. For example, one list (e.g., first list) may comprise of candidate files that can be deduplicated, whereas another list (e.g., the second list) may comprise of candidate files that cannot be deduplicated. The server may perform an iterative process for candidate files in each list. Moreover, the division of the plurality of candidate files may itself comprise an iterative process where each candidate file of the plurality of candidate files may be assessed to determine which list the candidate file may be placed into. For example, the server may begin an assessment of a candidate file of the plurality of candidate files (block 404), e.g., to assess whether to deduplicate and/or write-write protect, as will be discussed herein. The server may then determine whether the candidate file can be de-duplicated (block 406). For example, the server may review other files of the plurality of files stored in memory 104 to determine whether or not a duplicate or redundant file of the candidate file exists. If no duplicate or redundant file exists for the candidate file, the server may deem that the candidate file cannot be deduplicated. The candidate file may be added to the first list of candidate files that can be deduplicated (block 408). On the other hand, if the server finds one or more duplicate or redundant files of the candidate file, the server may deem that the candidate file can be deduplicated. The candidate file may be added to the second list of candidate files that cannot be deduplicated (block 422). As will be described herein, process 400 may involve performing iterative steps for candidate files in each list. However, after a candidate file has been added to either the first list or the second list, the server may begin assessment of yet another candidate file of the plurality of candidate files (block 404).

Referring to the first list, the server, may begin an assessment of a candidate file from the first list (block 410), of whether to deduplicate. Even though the first list comprises of files that can be deduplicated (e.g., based on the finding of duplicate or redundant files in memory 104), systems and methods described herein limit the automatic deduplication of files to only some of all files that can be deduplicated, e.g., to preserve computer resources. For example, as described later in process 400, the server may deduplicate files that the server has decided to write-protect, which may be based on a Bernoulli distribution. Thus, the server may begin the assessment by determining, whether the candidate file from the first list should be write-protected, based on a Bernoulli distribution that is customized for the first list ("first Bernoulli distribution") (block 412). The determination may be substantively similar to block 206 of FIG. 2, but with a Bernoulli distribution that is customized for the first list of process 400 (first Bernoulli distribution). The first Bernoulli distribution, generated by the Bernoulli distribution generator 114, can allow the server to write-protect only some of the files in the first list instead of all of the files on the first list. Once such files have been write-protected, such files may be deduplicated, as will be discussed in block 418. In contrast, the files of the second list were deemed to not be able to be deduplicated (at block 406), e.g., because no duplicate or redundant copies of the files existed. As will be discussed further herein, the iterative process performed on the second list of files also involves a determination of whether to write-protect candidate files from the second list, based on another Bernoulli distribution (second Bernoulli distribution). However, since the files in the first list that will be write-protected will also be deduplicated, the first Bernoulli distribution may be based on a probability, p, that is higher than that of the second Bernoulli distribution. Thus, the probability for a server to determine that a candidate file in the first list should be write-protected may be higher than the probability of the server to determine that a candidate file in the second list should be write-protected. If the server determines that the candidate file should not be write-protected, the server may shuffle to another candidate file on the first list to begin assessment of that candidate file (block 410).

If the server determines that the candidate file should be write protected, the server may assess whether or not the candidate file is already write-protected (block 414). As previously discussed, whether a candidate file is write-protected or not may be indicated as a metadata stored in the storage location of the file. Also or alternatively, the write-protection may be evident from the file itself, e.g., based on values stored or detected via the content indicator module 124. If the candidate file is not write-protected, the server may render the candidate file as a write-protected candidate file (block 416). In some aspects, the server may identify a file as not yet write-protected by detecting that the candidate file has been modified within a threshold number of "passes" (e.g., by processor 102 through a given program or computer-executable instruction). The process for write-protecting the file may be substantively similar to the process described in relation to block 208 of FIG. 2.

Afterwards, or if the candidate file is found to already be write protected at block 414, the server may deduplicate the candidate file (block 418). As previously discussed, deduplicating a given candidate file may involve comparing the contents of (e.g., values represented by) two or more files (e.g., the given write-protected candidate file being analyzed at the current iteration and one or more other candidate files) to determine whether a similarity threshold is satisfied.

If there are remaining candidate files in the first list to be assessed, the server may shuffle to the next candidate file the in the first list (block 420) to begin assessment (e.g., repeating blocks 410 through 418). Otherwise, the server may then then shuffle to another candidate file of the plurality of candidate files stored in memory 104 to see whether to place the candidate file in the first list or the second list (e.g., by repeating blocks 404 and 406). In some aspects, shuffling to another candidate file, in any of the iterative loops described herein, may involve a random selection of a candidate file within the designated group (e.g., memory 104, first list, second list, etc.). Also or alternatively, the shuffling may be based on a next consecutive number assigned to a candidate file (e.g., the next storage location of a list of storage locations for files of a given group). In some aspects, the iterative process of sorting the plurality of candidate files from memory 104 into the first list or the second list may occur in parallel to the iterative processes described for the first list (blocks 408 through 420) and/or the second list (blocks 422 through 432).

Referring now to the second list, the server may begin assessment of a candidate file from the second list (block 424). As noted before, the second list may comprise files that cannot be deduplicated, for example, because duplicate or redundant copies of the file were not found in the memory 104.

The server may determine whether to assess a candidate file for write-protection based on a second Bernoulli distribution (block 426). As previously discussed, the second Bernoulli distribution may be distinguishable from the first Bernoulli distribution because the probability for a server to determine that a candidate file should be write-protected may be lower under the second Bernoulli distribution than under the first Bernoulli distribution.

If the server decides to not write-protect the candidate file in the second list, the server may shuffle to another candidate file from the second list to begin the assessment of that candidate file (block 424). If the server decides to write-protect the candidate file at block 426, the server may determine whether the candidate file is already write-protected (block 428). This process may be substantively similar to block 414 that had been previously discussed.

If the server finds that the candidate file is not write-protected, the server may thus render the candidate file as a write-protected candidate file (block 430) using techniques previously discussed in relation to FIG. 2. However, if the candidate file is found to already be write-protected, the server may shuffle to another candidate file in the second list, and begin assessment of that candidate file (block 424).

Like block 420, the server may then determine whether there are remaining candidate files in the second list to be assessed (block 432). If there are remaining candidate files in the second list to be assessed, the server may shuffle to the next candidate file the in the second list to begin assessment (e.g., repeating blocks 424 through 432). Otherwise, the server may continue the previously described process of sorting the plurality of candidate files stored in memory 104, e.g., to see whether to place any given candidate file in the first list or the second list (e.g., by repeating blocks 404 and 406). In some aspects, the iterative process of sorting the plurality of candidate files from memory 104 into the first list or the second list may occur in parallel to the iterative processes described for the first list (blocks 408 through 420) and/or the second list (blocks 422 through 432).

Figure 5:
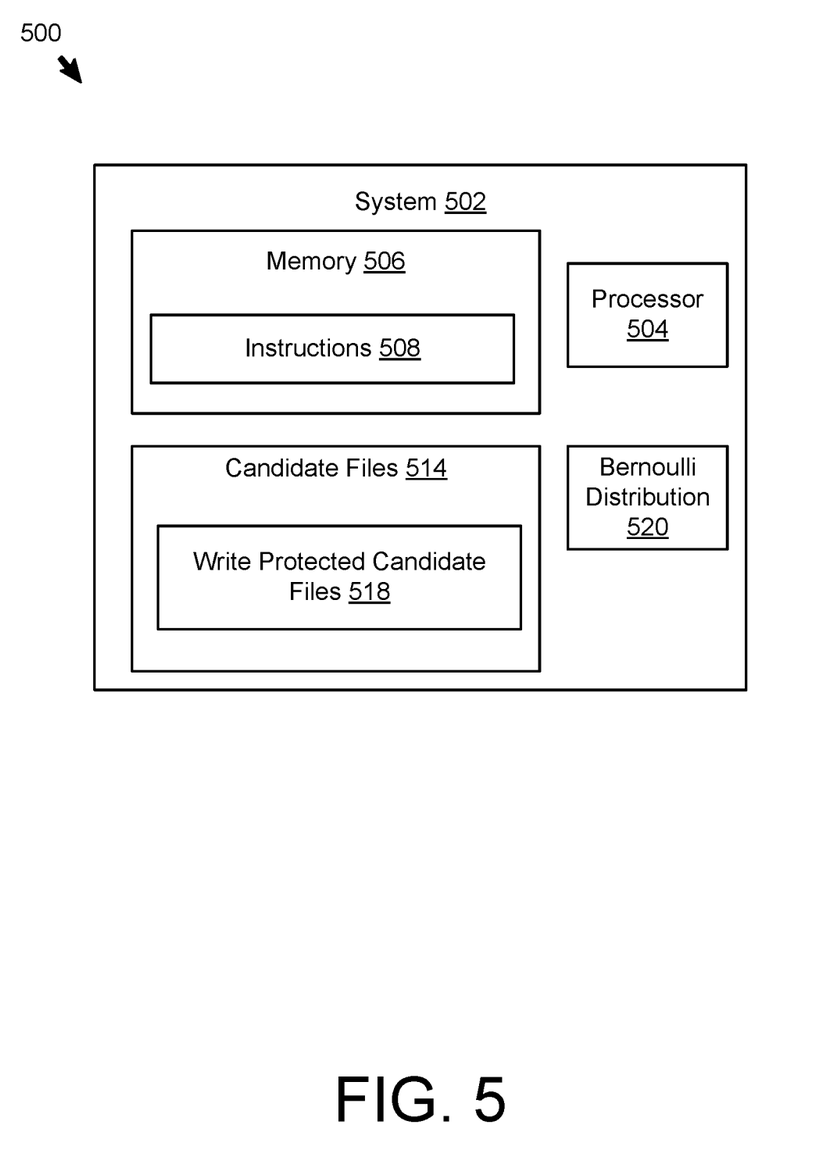
FIG. 5 illustrates a block diagram of an example computer system for an example process for a resource-efficient memory deduplication and write-protection, according to an example embodiment of the present disclosure.

FIG. 5 illustrates a block diagram of an example computer system 500 for an example process for a resource-efficient memory deduplication and write-protection, according to an example embodiment of the present disclosure. The system 500 may comprise a processor 504 and a memory 506 storing instructions 508. The system 502 may further comprise candidate files 514 and a Bernoulli distribution 520 (e.g., generated by Bernoulli distribution generator 114). The candidate files 514 may include write-protected candidate files 518 (and/or non-write-protected candidate files). The instructions 508, when executed by the processor 504, may cause the processor to receive a plurality of candidate files 514 to assess for write-protection and deduplication. The instructions 508, when executed by the processor 504, may cause the system 502 to perform one or more iterations of: determining whether a given candidate file of the plurality of candidate files 514 is write-protected. After determining that the given candidate file is not write-protected (e.g., part of the non-write-protected candidate files), the server may determine, based on a predetermined Bernoulli distribution 502, whether to write-protect the given candidate file. The instructions 508, when executed by the processor 504, may render, based on the Bernoulli distribution 502, the given candidate file as a write-protected candidate file (e.g., thus include the candidate file as part of the write-protected candidate files 518). The instructions 508, when executed by the processor 504, may cause the system 502 to determine, based on a review of other candidate files from the plurality of candidate files 514, that the write-protected candidate file can be deduplicated. The system may thus deduplicate the write-protected candidate file.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is as follows:

1. A method comprising:
   receiving, by a computing device having a processor, a request to assess deduplication for a plurality of candidate files;
   performing one or more iterations of:
   receiving, from the plurality of candidate files, a candidate file that is not write-protected;
   determining, based on a predetermined Bernoulli distribution, a decision to write-protect the candidate file;
   rendering the candidate file as a write-protected candidate file;

determining, based on a review of other candidate files from the plurality of candidate files, that the write-protected candidate file can be deduplicated; and deduplicating the write-protected candidate file.

2. The method of claim 1, wherein the Bernoulli distribution is based on a probability generated by a random number generation (RAN) function.

3. The method of claim 1, wherein the Bernoulli distribution is based on a network bandwidth of the computing device.

4. The method of claim 1, wherein the rendering the candidate file as the write-protected candidate file comprises:

saving a copy of the candidate file;

identifying, based on a comparison with the copy, a change to the candidate file; and reversing the change to the candidate file to cause the candidate file to satisfy a similarity threshold with the copy.

5. The method of claim 1, wherein the deduplicating the write-protected candidate file comprises:

searching, within a memory associated with the computing device, a duplicate file comprising at least a predetermined threshold of data found in the candidate file; and deleting the duplicate file.

6. The method of claim 1, wherein the deduplicating the write-protected candidate file comprises:

identifying, for the candidate file, a first location in a memory associated with the computing device, wherein the candidate file is stored in the first location;

searching, within the memory, a duplicate file comprising at least a predetermined threshold of data found in the candidate file; and identifying, for the duplicate file, a second location in the memory, wherein the duplicate file is stored in the second location.

7. The method of claim 6, further comprising:

deleting contents of the duplicate file from the second location; and storing, at the second location, a pointer to the first location.

8. The method of claim 6, further comprising:

deleting contents of the candidate file from the first location; and storing, at the first location, a pointer to the second location.

9. The method of claim 1, further comprising, prior to receiving the candidate file that is not write-protected, identifying a candidate file as not yet write-protected.

10. The method of claim 9, wherein the identifying the candidate file as not yet write-protected comprises:

detecting that the candidate file has been modified within a threshold number of passes.

11. A system comprising:

a processor; and memory storing instructions that, when executed by the processor, cause the processor to:

receive a plurality of candidate files to assess for write-protection and deduplication;

perform one or more iterations of:

determining whether a given candidate file of the plurality of candidate files is write-protected;

after determining that the given candidate file is not write-protected, determining, based on a predetermined Bernoulli distribution, whether to write-protect the given candidate file;

rendering, based on the Bernoulli distribution, the given candidate file as a write-protected candidate file;

determining, based on a review of other candidate files from the plurality of candidate files, that the write-protected candidate file can be deduplicated; and deduplicating the write-protected candidate file.

12. The system of claim 11, wherein the Bernoulli distribution is based on a probability generated by a random number generation (RAN) function.

13. The system of claim 11, wherein the Bernoulli distribution is based on a network bandwidth of the computing device.

14. The system of claim 11, wherein the instructions, when executed, cause the processor to deduplicate the write-protected candidate file by:

searching, within a memory associated with the computing device, a duplicate file comprising at least a predetermined threshold of data found in the given candidate file; and deleting the duplicate file.

15. The system of claim 11, wherein the instructions, when executed, cause the processor to:

identify a second candidate file of the plurality of candidate files as write-protected;

determine, based on a review of other candidate files, that the second candidate file can be deduplicated; and deduplicate the second candidate file.

16. A method comprising:

receiving, by a computing device having a processor, a plurality of candidate files to assess for write-protection and deduplication;

generating, based on a review of other candidate files, a first list of candidate files that can be deduplicated, and a second list of candidate files that cannot be deduplicated;

for each of a plurality of candidate files in the first list, determining, based on a predetermined first Bernoulli distribution, a first decision to either assess or deny permission to assess the candidate file in the first list for write-protection;

identifying, based on a permission to assess, the candidate file in the first list as a write-protected candidate file; and deduplicate the write-protected candidate file; and for each of a plurality of candidate files in the second list, determining, based on a predetermined first Bernoulli distribution, a second decision to either assess or deny permission to assess the candidate file in the second list for write-protection; and if a given candidate file in the second list is not write-protected, rendering, based on the second decision, the candidate file as a write-protected candidate file.

17. The method of claim 16, further comprising, prior to the identifying the candidate file in the first list as a write-protected candidate file:

identifying the candidate file in the first list as not write-protected; and rendering, based on the first decision, the candidate file as a write-protected candidate file.

18. The method of claim 17, wherein the identifying the candidate file in the first list as not yet write-protected comprises:

detecting that the candidate file has been modified within a threshold number of passes.

19. The method of claim 16, wherein the first Bernoulli distribution is greater than the second Bernoulli distribution, such that a greater proportion of candidate files in the first list to be assessed for write-protection than candidate files in the second list to be assessed for write-protection.

20. The method of claim 16, wherein the first Bernoulli distribution is based on a first probability generated by a random number generation (RAN) function, wherein the second Bernoulli distribution is based on a second probability generated by the random number generation (RAN) function, wherein the first probability is greater than the second probability.

\* \* \* \* \*